(12) United States Patent
Schmidt

(10) Patent No.: US 6,760,975 B1
(45) Date of Patent: Jul. 13, 2004

(54) VIAL HOLDING LEVEL

(75) Inventor: Sheldon Schmidt, Paramus, NJ (US)

(73) Assignee: Great Neck Saw Manufacturers, Inc., Mineola, NY (US)

( * ) Notice: Subject to any disclaimer, the term of this patent is extended or adjusted under 35 U.S.C. 154(b) by 0 days.

(21) Appl. No.: 10/260,825

(22) Filed: Oct. 1, 2002

(51) Int. Cl.[7] .................................................. G01C 9/28
(52) U.S. Cl. ............................................. 33/382; 33/379
(58) Field of Search .......................... 33/379, 381, 382, 33/383, 369

(56) References Cited

U.S. PATENT DOCUMENTS

| | | | |
|---|---|---|---|
| 948,570 A | 2/1910 | Anderson | |
| 1,001,206 A | 8/1911 | Mc Cullough | |
| 1,027,533 A | 5/1912 | Finn | |
| 1,036,601 A | 8/1912 | Frank | |
| 1,169,005 A | 1/1916 | Caswell et al. | |
| 1,780,253 A | 11/1930 | Volz | |
| 2,118,470 A | 5/1938 | Melvin | |
| 2,495,646 A | * 1/1950 | Schultes et al. | ............... 33/381 |
| 2,750,677 A | 6/1956 | Wirth | |
| 2,750,678 A | * 6/1956 | Roberts | ........................ 33/381 |
| 2,825,144 A | 3/1958 | Warden | |
| 3,190,010 A | 6/1965 | Johnson | |
| 3,738,015 A | 6/1973 | De Jong | |
| 3,835,549 A | 9/1974 | De Jong et al | |
| 3,871,110 A | 3/1975 | Gutowski | |
| 3,889,353 A | * 6/1975 | Provi | .......................... 33/381 |
| 4,011,660 A | 3/1977 | Johnson | |
| 4,124,940 A | 11/1978 | Vaida | |
| 4,208,803 A | 6/1980 | Brown | |
| 4,492,038 A | 1/1985 | Mayes | |
| 4,534,117 A | * 8/1985 | Haefner et al. | ............... 33/379 |
| 4,765,061 A | 8/1988 | Rawlings | |
| 4,991,303 A | 2/1991 | Marth et al. | |
| 4,996,777 A | 3/1991 | Grosz | |
| 5,033,199 A | 7/1991 | Wilcox et al. | |
| 5,105,549 A | 4/1992 | Johnson | |
| 5,199,177 A | 4/1993 | Hutchins et al. | |
| 5,406,714 A | 4/1995 | Baker et al. | |
| 6,148,530 A | 11/2000 | Jacoff et al. | |
| 2003/0140511 A1 | * 7/2003 | Obergoenner | ................ 33/379 |

* cited by examiner

Primary Examiner—G. Bradley Bennett
(74) Attorney, Agent, or Firm—Joseph J. Previto

(57) ABSTRACT

A level having a pair of opposed edge rails, a web connecting the edge rails together, one of edge rails having an edge rail window therein with a cavity in the web communicating with the edge window. A vial assembly is mounted at said cavity in which the vial may be viewed from the edge rail window or from the sides of the web. Web openings may also be provided in the web with vial holding assemblies mounted in each web opening.

19 Claims, 4 Drawing Sheets

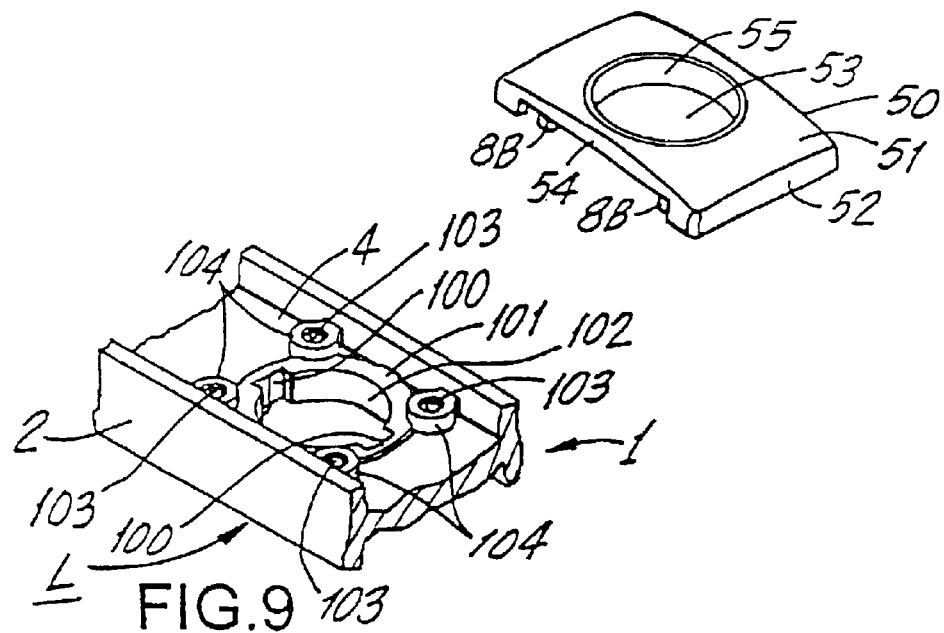
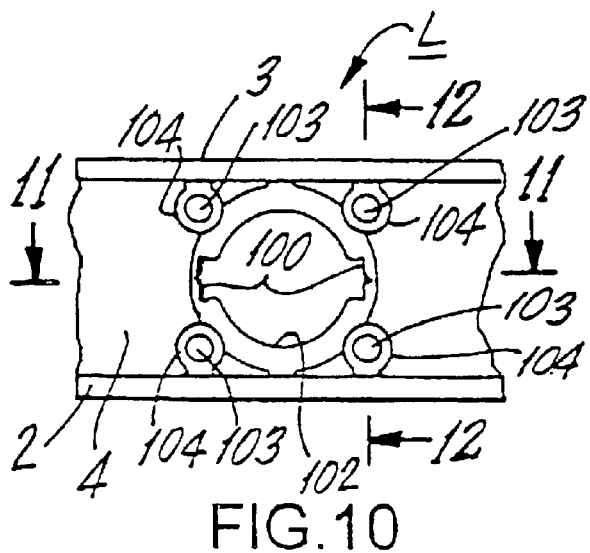
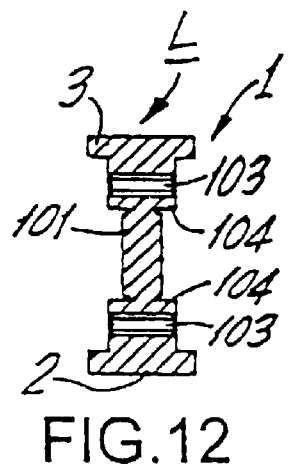
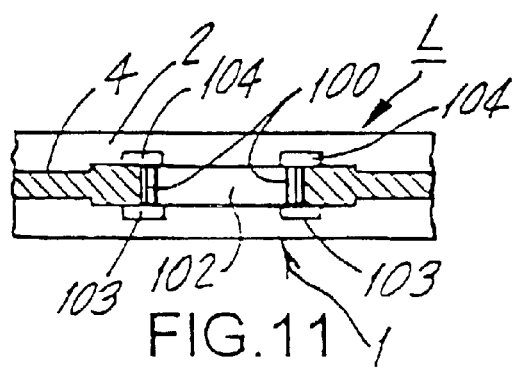

VIAL HOLDING LEVEL

BACKGROUND

This invention relates to a level and more particularly to a level in which a plurality of vial assemblies are mounted on the level.

Such levels comprise a frame having an I-beam configuration which includes a pair of opposed edge rails connected together by a web. A plurality of spaced vial assemblies are mounted in spaced web openings in the web. These web openings permit the vials of the vial assemblies to be mounted on the web at different angles with respect to the edge rails. In some of these levels, an edge rail window is also provided in an edge rail to permit a vial to be viewed from the edge rail as well as from the web.

OBJECTS

One object of the present invention is the provision an improved level with at least one web opening in the web and at least one edge rail opening in an edge rail.

Another object of the present invention is the provision of an improved level with a plurality of vial assemblies to permit viewing a vial from both an edge rail and from the web.

Another object of the present invention is the provision of an improved level which has different types of vial assemblies thereon.

Another object of the invention is to provide an improved level that has vial assemblies which are of simple construction and which are economical, simple and efficient to use and manufacture.

Other and further objects of the invention will be obvious upon an understanding of the illustrative embodiment about to be described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein:

FIG. 9 is a fragmentary expanded perspective view of another embodiment of the present invention.

FIG. 10 is a plan view of the frame of the embodiment of FIG. 9.

FIG. 11 is a sectional view taken alone line 11—11 of FIG. 10.

FIG. 12 is a sectional view taken along line 12—12 of FIG. 10.

DESCRIPTION

Figure 1:
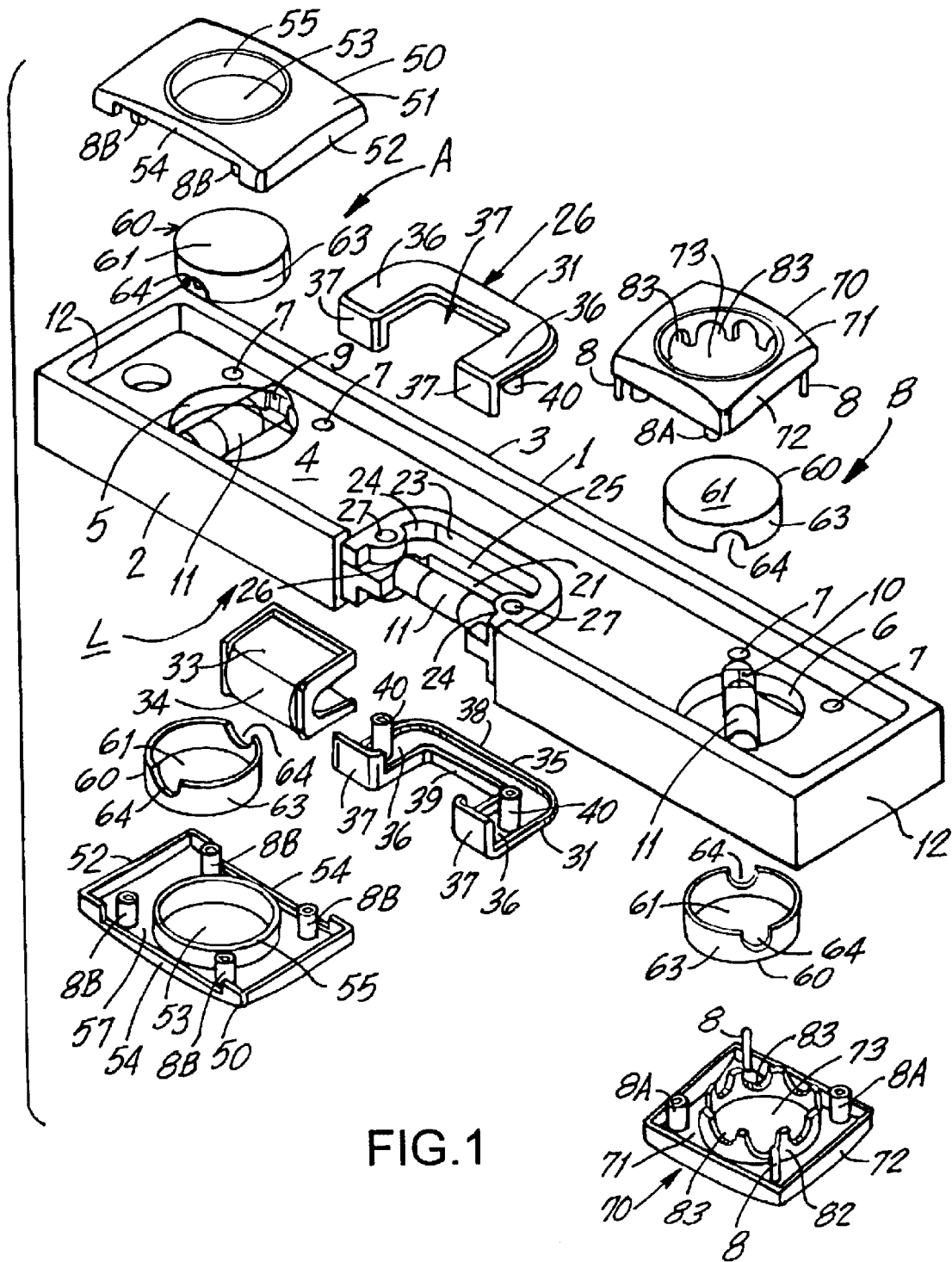
FIG. 1 is an exploded perspective view showing the various parts of a level made in accordance with the present invention.
Figure 2:
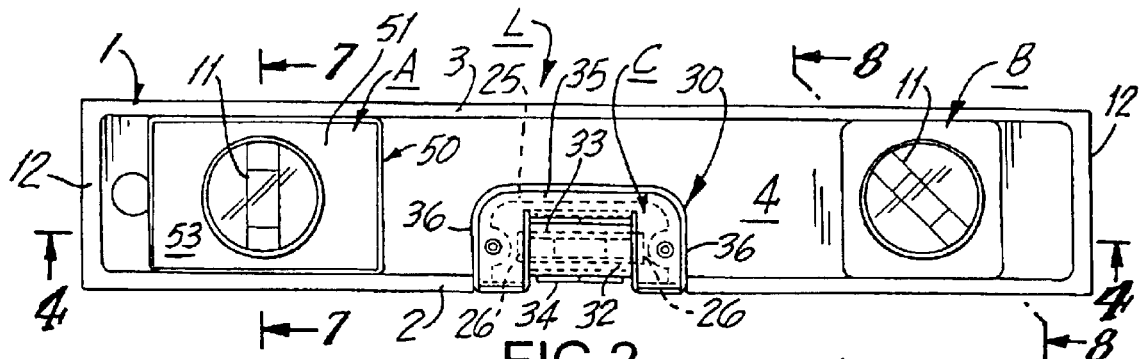
FIG. 2 is a plan view of the level.
Figure 3:
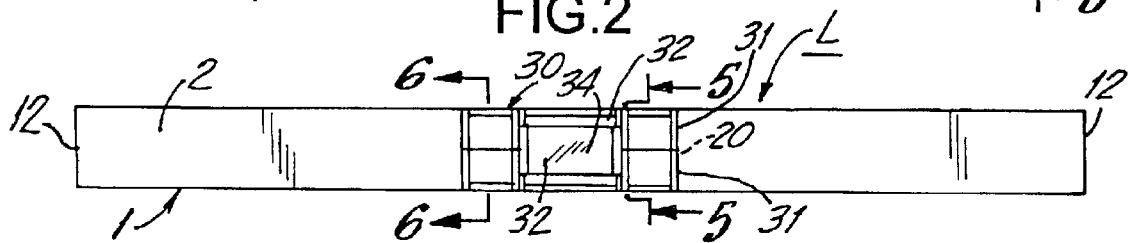
FIG. 3 is an edge view of the level.
Figure 4:
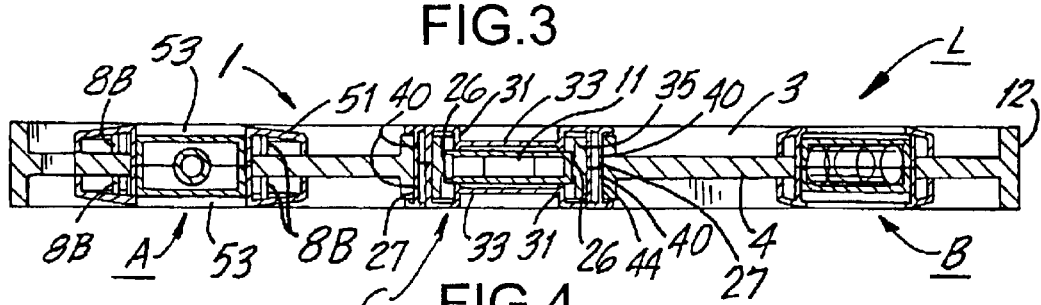
FIG. 4 is a sectional view taken along line 4—4 of FIG. 2.
Figure 5:
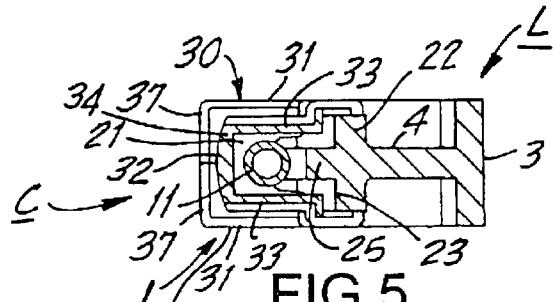
FIG. 5 is a sectional view taken along line 5—5 of FIG. 3.
Figure 6:
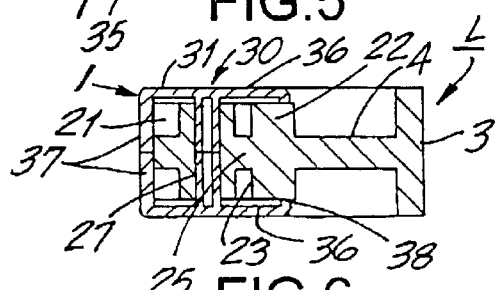
FIG. 6 is a sectional view taken along line 6—6 of FIG. 3.
Figure 7:
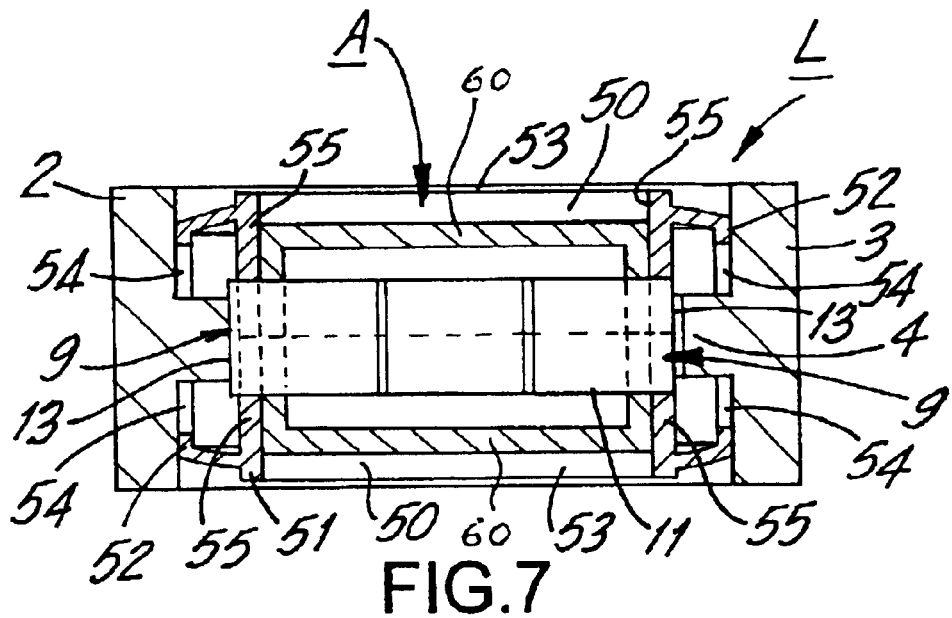
FIG. 7 is a sectional view taken along line 7—7 of FIG. 2.
Figure 8:
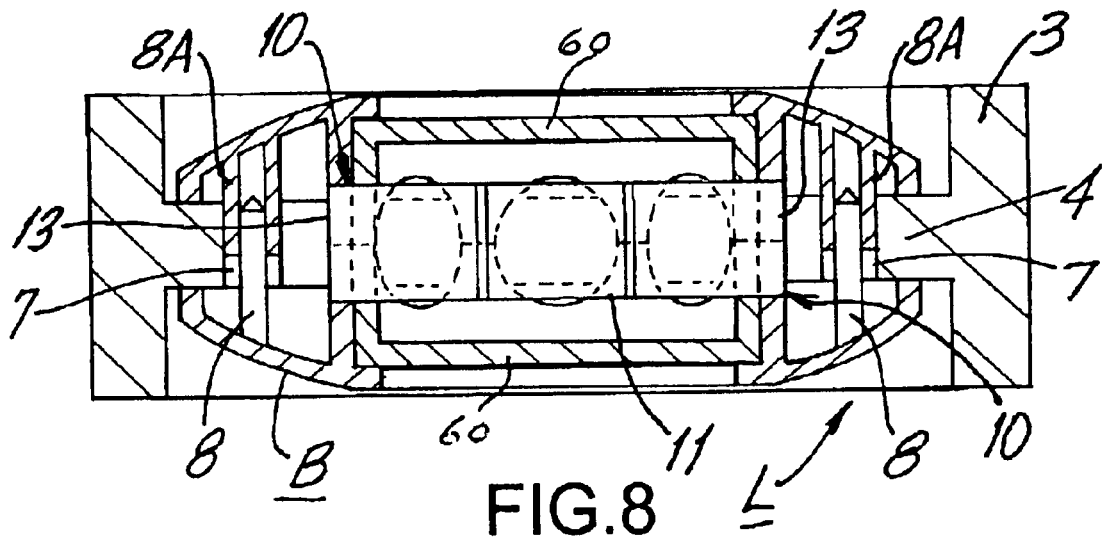
FIG. 8 is a sectional view taken along line 8—8 of FIG. 2.

Referring to the drawings, and more particularly to the embodiment of the invention of shown in FIGS. 1 to 8, the level L of the present invention comprises a frame 1 having a plurality of first and second vial assemblies A and B, and an edge rail vial assembly C. The frame 1 is elongated and is preferably made of a light-weight material, such as a foam material. The frame 1 is shown in the form of an I-beam having upper and lower edge rails 2 and 3 joined together along their longitudinal center lines by the web 4. A plurality of web openings 5 and 6 are formed in the web 4 (preferably adjacent the longitudinal center of the frame 1) to receive the vial assemblies A and B. respectively. Suitable holes 7 (four shown—but more may be used) are formed in the web 4 adjacent the periphery of the web openings 5 and 6 for receiving male and female friction plugs 8A and 8B, respectively, to fasten the vial assemblies A and B to the web 4, as will be described in greater detail hereinafter. If desired, screws or other fastening means may also be used to fasten the vial assemblies A and B to the web.

Vial holding notches 9 and 10 are formed in opposed edges of the web openings 5 and 6, respectively, to permit a vial 11 to be mounted therein by its end edge 13. In the drawings, the notches 9 and 10 and the vials 11 at different web openings 5 and 6 have been shown and described as being preferably oriented at different angles to each other and to the edge rails 2 and 3. However, if will be understood that the notches 9 and 10 and the vials 11 may be oriented at the same angle to each other and to the rails 2 and 3 without departing from the invention. The web openings 5 and 6 have been shown and described as being preferably circular. However, it will be understood that it is within the purview of the present invention for the web openings 5 and 6 to be of a different shape, such as rectangular or square. Furthermore, the frame 1 of the level L has been shown and described as having two web openings 5 and 6 and two vial assemblies A and B. However, it will be understood that a greater or lesser number of web openings (5 and 6) and vial assemblies (A and B) may also be used on the level L without departing from the invention.

The edge rail vial assembly C comprises a rail edge window 20 formed in the edge rail 2 and a generally U-shaped elongated cavity 21 formed in the adjoining web 4 and communicating with the rail edge window 20. The cavity 21 is preferably provided with an upstanding strengthening flange 22 surrounding the cavity 21. Preferably, and as shown in the drawing, the cavity 21 is positioned approximately equally between the ends 12 of the frame 1. However, it will be understood that the cavity 21 may be formed elsewhere along the frame 1 and may be of a different shape, without departing from the invention.

The cavity 21 has a base 23, a pair of side walls 24 extending therefrom and a ridge 25 along its entire inner surface. Opposed notches 26 are provided in the ridge 25 to receive a vial 11 therein. Holes 27 are provided in the flange 22 to permit the parts to be held together as two; be described hereinafter.

A vial cover assembly 30 is provided to cover the edge window 20, the cavity 21 and the vial 11. The vial cover assembly 30 comprises a pair of mating U-shaped retaining caps 31 adapted to cover the cavity 21 from each side of the web 4 and a U-shaped window cover 32 adapted to sit over and cover the cavity 21 and the rail edge window 20.

The window cover 32 has a pair of legs 33 and a base 34. Its legs 33 straddle the vial 11 (the space between legs 33 being greater than the thickness of the vial) and are inserted within the cavity 21 through the rail edge window 20. The base 34 is positioned in the rail edge window 20 either flush with or below the level of the edge rail 2. The base 34 of the window portion 32 is preferably made of a magnifying material while the legs 33 may be made of a non-magnifying material. However, it will be understood that the entire window cover 32 may be formed from magnifying or non-magnifying materials, as may be desired, without departing from the invention.

The mating retaining caps 31 are used to retain the window cover 32 in place. The retaining caps 31 are U-shaped and have a base 35 and legs 36 extending therefrom to form a viewing window 37 therebetween. The ends of the legs 36 have retainer feet 37 extending at right angles thereto. Inner and outer ledges 38 and 39 are provided along the outer edges of the base 35, legs 36 and feet 37. Friction plugs 40 extend from the legs 33 as we adapted to enter holes 27.

To assemble the edge rail vial assembly C, the vial 11 is mounted with its cylindrical ends positioned in the opposed vial holding notches 25 in the ridge 25 of the cavity 21. The window cover 32 is then inserted into the cavity 21 with its legs 33 straddling the vial 11 to a position flush with or below the surface of the rail edge surface 2. Thereafter, the retaining caps 31 are assembled over the window cover 32 on each side of the web 4 so that the ledges 38 and 39 of the legs 36, base 35 and bear against the base 34 and legs 33 of the window cover 32 to hold it in place. The friction plugs 40 extend through the holes 27 to hold the parts in place. Alternately, screws may be inserted through holes 27 and the retaining caps 31 to hold the parts in place.

The vial assembly A for the web opening 5 comprises a pair of outer cover plates 50 and a pair of inner vial covers 60. The outer cover plates 50 are substantially similar in construction to each other and each comprises a body 51 and upstanding peripheral wall 52 extending upwardly therefrom). A transparent window 53 is provided in the body 51 of each outer cover plate 50 each cover plate 50 and preferably an elongated slot 54 is provided on opposite sides of its upstanding peripheral wall 52. Preferably the body 51 is opaque and the window 53 is transparent. However, the body 51 may also be made transparent if desired. A peripheral wall 55 surrounds the window 53 and extends inwardly from the body 51. The body 51 has raised male and female friction plugs 8 and 8A, respectively, extending upwardly from the body 51 which are adapted to extend through the holes 7 in the web 4 and are frictionally held in place to hold the vial assembly A in place. Preferably, the outer cover plates 50 are opaque, but, if desired, they may be transparent without departing from the invention. The outer cover plates 50 are preferably rectangular with the long edge thereof parallel to the edge rails 2 and 3. However, they may be of other shapes, if desired.

The inner vial covers 60 of vial assembly A are similar to each other in construction. The inner vial covers 60 comprises a transparent base 61 with a peripheral wall 63 extending therefrom. The base 61 of each inner vial cover 60 is adopted to fit into and sit beneath the window 53 in the body 51 of one of the outer cover plates 50. Opposed circular vial receiving indentations 64 are provided in the peripheral wall 63 to receive and hold a vial 11 in place.

To assemble the vial assembly A, the inner vial covers 60 are mounted over the vial 11 on each side of the web 4 so that their indentations 64 press on the vial 11 from each side and hold the vial 4 in place. The outer cover plates 50 are then placed over the inner vial covers 60 so that the base 61 of each inner vial cover 60 is beneath the window 53 in the outer cover plate 50. The outer cover plates 50 are then held together by the friction plugs 56 extending through holes 7 to complete the assembly of the vial assembly A by locking the inner vial covers 50, the outer cover plates 60 and the vial 11 together.

The other vial assembly B comprises a pair of outer cover plates 70 and a pair of inner vial covers 60 which are similar in construction to the inner vial covers 60 shown and described in connection with the direction of vial assembly A, above so that the same reference numerals will be used. The outer cover plates 70 are similar in construction to each other and preferably have a body 71 with an upstanding side wall 72 and an opening 73 in its body 71. A peripheral wall 82 extends inwardly along the opening 73. A plurality of semi-circular vial holding indentations 83 are provided along the upstanding peripheral wall 82. This permits the outer cover plate 70 to be used regardless the angular orientation of the vial 11 on the web 4. The inner vial covers 60 which are similar in construction to the inner vial covers 60 used in vial assembly A have a body 61, an upstanding peripheral wall 63 and opposed vial holding indentations 64.

To assemble vial assembly B, the vial 11 is placed in web notches 10 in the web opening 6 which are axially at an angle to the edge rails 2 and 3 so that vial 11 is at an angle to the edge. rails 2 and 3. The inner vial covers 60 are placed over the vial 11 from each side so that the vial holding indentations 64 on and hold the vial 11 in the web notches 10 from opposite sides of the web 4. The outer cover plates 70 are then placed over the inner vial covers 60 so that the base 61 of each inner vial cover 60 extends into and sits in the opening 73 in each outer cover plate 70. The outer cover plates 70 are then held together by friction plugs 8 and 8A extending through holes 7 to complete the assembly of the vial assembly B by holding the vial 11, inner vial covers 80 and outer cover plates 70 together.

In the embodiment of the invention shown in FIGS. 9–12, vials (not shown) are mounted in vial notches 100 in an upstanding thick flange 101 surrounding the web opening 102. Openings 103 with reinforcing sleeves 104 are provided extending through the web 4. The outer cover plate 50 of vial assembly A may then be used to cover the vial 11 in this embodiment. It will be noted that no inner vial cover is necessary in this embodiment. The flange 101 is thick enough to receive the entire diametrical thickness of the vial and the edge of the peripheral wall 55 of the outer cover plate 50 sits on the vial from each side of the web 4 to hold it in place.

As set forth above, two types of vial assemblies A and B have been described and shown with respect to this invention. However, it will be understood that is within the purview of the present invention that more or less of these vial assemblies A or B may be used on the same level frame 1. In addition, a single edge rail vial assembly C has been shown and described as being on one edge rail 2 only. It will be understood that more than one edge rail assembly C may be provided on edge rail 2 and/or on edge rail 3 without separating from the invention.

It will thus be seen that the present invention provides an improved level with at least one web opening in the web and at least one edge opening in an edge rail, with improved vial assemblies to permit viewing a vial from both its rail edge and the web, in which different vial assemblies may be used on the same level and which are of simple construction and economical, simple and efficient to use and manufacture.

As many and varied modifications of this subject matter of this invention will become apparent to those skilled in the art from the detailed description given herein above, it will be understood that the present invention is limited only as provided in the claims appended hereto.

What is claimed is:

1. A level comprising a pair of opposed edge rails, a web connecting the edge rails together, one of said edge rails having an edge rail window therein, a u-shaped cavity in said web communicating with said edge rail window, a vial assembly mounted at said cavity, said vial assembly comprising a vial mounted in said cavity, a window cover mounted over said vial through said edge rail window and a pair of outer cover plates mounted over said cavity from each side of said web, said window cover is u-shaped and comprises a base substantially parallel to said rail and a pair of legs extending from said base substantially at right angles to the base, the length of the base and the legs parallel to said rail being substantially equal, said window cover base overlies said vial from said edge rail window and said window cover legs lie over said vial from each side of said web, said cover plates match each other and are mounted on each side of the web over the legs of said window cover.

2. A level as set forth in claim 1, wherein the entire periphery of said cavity has an upstanding ridge and wherein said vial is mounted on said ridge.

3. A level as set forth in claim 2, wherein said outer cover plates are u-shaped having a base and opposed legs to form a space therebetween and wherein the legs of said window cover lie in the said space.

4. A level as set forth in claim 3, wherein the end edges of the legs of the outer cover plates are at right angles thereto and overly at least a portion of the base of the window cover.

5. A level as set forth in claim 4, wherein said outer cover plates are mounted over said upstanding ridge.

6. A level as set forth in claim 5, wherein said upstanding ridge has openings therein and wherein securing means are provided in said outer ledge to secure said vial assembly in place.

7. A level as set forth in claim 1, wherein a web opening in said web, a vial assembly mounted at said web opening, said vial assembly comprising a vial mounted in said web opening, an outer cover plate mounted over said vial on each side of said web opening, each of said outer cover plates having a body and a window in said body, and a window peripheral wall extending from said window.

8. A level as set forth in claim 7, wherein a second web opening is provided in said web, a vial assembly mounted at said second web opening, said vial assembly comprising a vial mounted in said second web opening, an inner vial cover mounted over said vial on each side at said second web opening, an outer cover plate mounted over said inner vial cover on each side of said second web opening, said inner vial cover having a base, each of said outer cover plates having a body, an opening in said body and a peripheral wall extending from said body, the base of each of said inner vial covers being mounted in the opening of each of said cover plates, the said inner vial covers being located within the confines of the body of each of the outer cover plates and within the upstanding peripheral wall of each outer cover plate, a peripheral wall extending from said opening in the body, said cover plate peripheral wall having a plurality of notches therein, said inner vial covers have a peripheral wall extending upwardly from said base, notches are provided in opposed peripheral walls of said inner vial covers to receive and hold a vial.

9. A level as set forth in claim 1, wherein a web opening in said web, a vial assembly mounted at said web opening, said assembly comprising a vial mounted in said web opening, an inner vial cover mounted over said vial on each side at said web opening, an outer cover plate mounted over said inner vial cover on each side of said web opening, said inner vial cover having a base, each of said outer cover plates having a body, an opening in said body and a peripheral wall extending from said body, the base of each of said inner vial covers being mounted in the opening of each of said cover plates, the said inner vial covers being located within the confines of the body of each of the outer cover plates and within the upstanding peripheral wall of each outer cover plate, a peripheral wall extending from said opening in the body, said cover plate peripheral wall having a plurality of notches therein, said inner vial covers have a peripheral wall extending upwardly from said base, notches are provided in opposed peripheral walls of said inner vial covers to receive and hold a vial.

10. A level comprising a web, an edge rail connected to said web, a web opening in said web, a vial assembly mounted at said web opening, said vial assembly comprising a vial mounted in said web opening, an outer cover plate mounted over said vial on each side of said web opening, each of said outer cover plates having a body, a window in said body and a peripheral window wall extending from said window, a body peripheral wall extends from said body, a slot is provided on at least a portion of the body peripheral wall on each of said outer cover plates, said slot being elongated and parallel to the edge rail.

11. A level as set forth in claim 10, wherein a thick flange surrounds said web opening and wherein opposed vial holding notches are provided in said flange and wherein said peripheral window wall bears against said vial from each side of said web.

12. A level as set forth in claim 10 wherein an inner vial cover mounted over said vial on each side at said web opening, said outer cover plates mounted over said inner vial cover on each side of said web opening, said inner vial cover having a base, an opening in said base, the base of each of said inner vial covers being mounted beneath the window of each of said cover plates, the said inner vial covers being located within the confines of the body of each of the outer cover plates and within the upstanding peripheral wall of each outer cover plate, a peripheral wall extending from said opening in the base, said cover peripheral wall having opposed notches therein to receive and hold a vial therein.

13. A level comprising a web, an edge rail connected to said web, a web opening in said web, a vial assembly mounted at said web opening, said vial assembly comprising a vial mounted in said web opening, an inner vial cover mounted over said vial on each side at said web opening, an outer cover plate mounted over said inner vial cover on each side of said web opening, said inner vial cover having a base, each of said outer cover plates having a body, an opening in said body and a peripheral wall extending from said body, the base of each of said inner vial covers being mounted in the opening of each of said outer cover plates, the said inner vial covers being located within the confines of the body of each of the outer cover plates and within the upstanding peripheral wall of each outer cover plate, a peripheral wall extending from said opening in the body, said cover plate peripheral wall having a plurality of notches therein.

14. A level as set forth in claim 13, wherein said inner vial covers have a peripheral wall extending upwardly from said base.

15. A level as set forth in claim 14, wherein notches are provided in opposed peripheral walls of said inner vial covers to receive and hold a vial.

16. A vial assembly for a level having a pair of opposed edge rails, a web connecting the edge rails together having one of the edge rails having an edge rail window therein, a cavity in the web communicating with the edge rail window and a vial mounted at the said cavity, comprising a vial for mounting in the cavity a window cover for mounting over the vial and a pair of outer cover plates for mounting from each side of the web, said window cover being u-shaped and comprising a base and a pair of legs extending substantially at right angles to the base, the length of the base and the legs parallel to an edge rail being substantially equal from said base, said window cover base overlying the vial from the edge rail window cover legs lie over the vial from each side of the web, the cover plates match each other and overlie the legs of the window cover, said outer cover plates being u-shaped having a base and opposed legs to form a space therebetween and wherein the legs of said window cover lie in the said space.

17. A vial assembly for a level having an edge rail connected to the web, a web opening in said web and a vial mounted at the web opening, said vial assembly comprising an outer cover plate over a vial on each side of the web opening, and an inner cover plate on each side of a vial, each of said inner vial covers having a base, each of said outer cover plates having a body and a window in said body, a window peripheral wall extending from said window, said inner vial covers being mounted within the window in said body.

18. A vial assembly for a level having a web, an edge rail connected to the web, a web opening in the web and a vial mounted at the web opening, said vial assembly comprising an inner vial cover, an outer cover plate mounted over said inner vial cover for mounting on each side of the web opening, said inner vial cover having a base, each of said outer cover plates having a body, an opening in said body and a peripheral wall extending from said body, the base of each of said inner vial covers being mounted in the opening of each of said cover plates, the said inner vial covers being located within the confines of the body of each of the outer cover plates and within the upstanding peripheral wall of each outer cover plate, a peripheral wall extending from said opening in the body, said cover plate peripheral wall having a plurality of notches therein, said inner vial covers have a peripheral wall extending upwardly from said base, notches being provided in opposed peripheral walls of said inner vial covers to receive and hold a vial.

19. A level comprising a pair of opposed edge rails, a web connecting the edge rails together, a web opening in said web, a vial assembly mounted at said web opening, said vial assembly comprising a vial mounted in said web opening, an outer cover plated mounted over said vial on each side of said web opening, each of said outer cover plates having a body and a window, a window peripheral wall extending from said window, a second web opening in said web, a vial assembly mounted at said second web opening, said vial assembly comprising a vial mounted in said second web opening, an inner vial cover mounted over said vial on each side at said second web opening, an outer cover plate mounted over said inner vial cover on each side of said second web opening, said inner vial cover having a base, each of said outer cover plates having a body, an opening in said body and a peripheral wall extending from said body, the base of each of said inner vial covers being mounted in the opening of each of said cover plates, the said inner vial covers being located within the confines of the body of each of the outer cover plates and within the upstanding peripheral wall of each outer cover plate, a peripheral wall extending from said opening in the body, said cover plate peripheral wall having a plurality of notches therein, said inner vial covers have a peripheral wall extending upwardly from said base, notches are provided in opposed peripheral walls of said inner vial covers to recieve and hold a vial.

* * * * *